J. HARTNESS.
VARIABLE SPEED MECHANISM FOR METAL WORKING MACHINES.
APPLICATION FILED SEPT. 7, 1911.

1,090,300.

Patented Mar. 17, 1914.
6 SHEETS—SHEET 1.

J. HARTNESS.
VARIABLE SPEED MECHANISM FOR METAL WORKING MACHINES.
APPLICATION FILED SEPT. 7, 1911.

1,090,300.

Patented Mar. 17, 1914.
6 SHEETS—SHEET 4.

UNITED STATES PATENT OFFICE.

JAMES HARTNESS, OF SPRINGFIELD, VERMONT.

VARIABLE-SPEED MECHANISM FOR METAL-WORKING MACHINES.

1,090,300.         Specification of Letters Patent.    Patented Mar. 17, 1914.

Application filed September 7, 1911.   Serial No. 648,166.

*To all whom it may concern:*

Be it known that I, JAMES HARTNESS, a citizen of the United States, and resident of Springfield, in the county of Windsor and State of Vermont, have invented certain new and useful Improvements in Variable-Speed Mechanism for Metal-Working Machines, of which the following is a specification.

This invention has relation to metal-working machines, and while it is especially designed for employment in connection with lathes, nevertheless it is applicable for use in connection with various other forms of machines in which it is desired to vary the speed of the driven element.

In metal-working machines such as turret lathes there is a tool carrier which is fed lengthwise of the bed by power driven mechanism, and in some of them a work carriage fed crosswise on the bed by similar mechanism. The mechanism for effecting the movement of these carriages consists of gearing and clutches so constructed that by shifting the clutches the carriages may be driven at any one of several different speeds. It is commonly necessary for the operator of such machines to consult speed tables, which are usually affixed to the machine, so as to set the clutches to secure the desired speed of the carriage. This is a matter which requires considerable judgment on the part of the operator and occasionally requires the expenditure of much time in adjusting the mechanism to secure the desired end.

The object of the present invention is to eliminate to a large extent the work of the operator in adjusting the clutches of the speed-changing mechanism and to simplify this operation. To this end I provide a suitable variable speed gearing having the requisite number of clutches or change gears so that the driven element may be moved at any one of a number of speeds, and in connection therewith I provide a selector mechanism including a selector which controls the clutches or change gears and which may be moved to any predetermined position so as to render active the particular train of gearing to secure the desired speed.

The invention further includes numerous improvements which are illustrated upon the drawings which I will subsequently explain.

Referring to said drawings: Fig. 4ª represents an end elevation of the head of the machine. Fig. 4ᵇ represents a plan view of the friction-control mechanism for the feed shafts. Fig. 4ᶜ represents a section on the line C—C of Fig. 4ᵇ. Fig. 8 represents a section on the line 8—8 of Fig. 1 and illustrates a part of the mechanism on the front of the bed. Fig. 9 illustrates the connection between the selector mechanism and one of the disk clutches for disconnecting the variable-speed mechanism for the carriage-driving shafts when the selector is being adjusted. Fig. 10 represents a plan view of the selector mechanism. Fig. 11 represents a section through the selector mechanism, and shows the selector in inactive position. Fig. 11ª represents a longitudinal section through one of the carriage-moving shafts to show the disk clutch. Figs. 12 and 13 are sectional detail views illustrating a portion of the same mechanism as that shown in Fig. 9.

The same reference characters indicate the same or similar parts wherever they occur.

Before proceeding to a detailed description of the machine which I have illustrated on the drawings, I desire to have it understood that said machine constitutes only one embodiment of the invention and that the invention is not limited to its application to a machine of this character, but may be utilized in various machines of widely differing design and for accomplishing widely different purposes.

I also desire to have it understood that the various details of the mechanism which I shall explain may be changed without departing from the spirit and scope of the invention, and further that the phraseology or nomenclature which I have adopted in the specification and claims is for the purpose of description and not of limitation.

Figure 1:
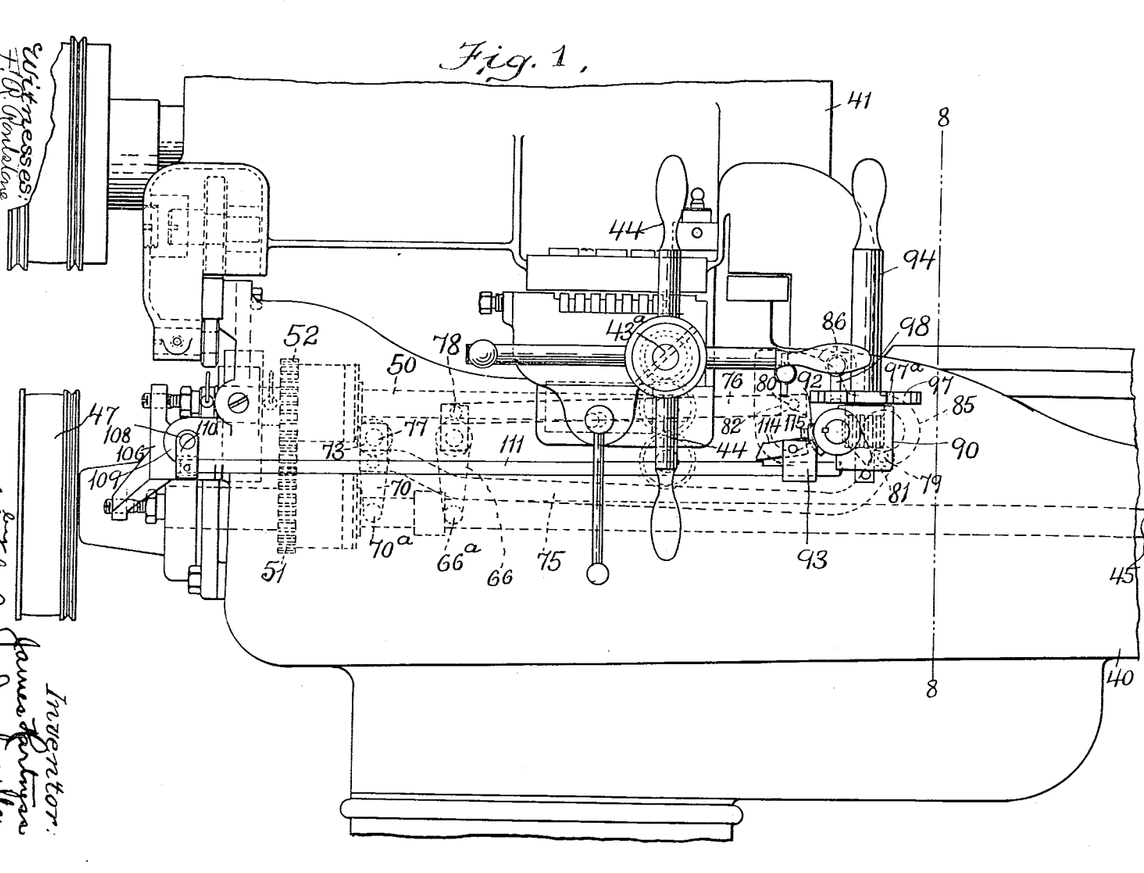
Figure 1 represents in side elevation a portion of a metal-working lathe equipped with my invention.

Referring to the drawings: The metalworking lathe there shown comprises a bed 40 of the general character of that illustrated in Letters Patent 792,591, granted to me June 20, 1905. It is provided with the usual longitudinal ways or shears, upon which is mounted to slide a tool carriage having a rotatable turret thereon substantially as shown in the said Letters Patent. At the end of the machine there is a transversely movable head or work carriage 41 provided with one or more work spindles as illustrated in the co-pending application of George A. Perry and myself Serial No. 648,147 filed September 7, 1911. The work carriage is provided on its under side with a nut 42 which projects downwardly into the bed and is engaged by a feed screw 43 journaled in the bed and having a forwardly projecting end 43ª equipped with a handle 44 by which it may be rotated to feed the work carriage transversely of the bed. The tool carriage (which is not shown) is fed longitudinally of the bed either by hand or by means of a shaft 45 shown in Figs. 1 and 2. Either the shaft 45 or the shaft 43 may constitute what I term a driven element, the speed of which it is desired to control. The initial driving element or member consists in the present instance of a shaft 46 to which power is applied through the medium of a pulley 47 secured thereon. In the present embodiment of the invention the shaft 46, as illustrated in Figs. 1, 2 and 5, is journaled in a box in the bed, and power is applied to the pulley 47 by means of a belt driven from any convenient source of power, as from a shaft on the work carriage.

From the shaft 46 power is transmitted to the driven shafts 43 and 45 to rotate said shafts at any one of a predetermined number of speeds. The shaft 43 is provided with a worm wheel 48 which may be engaged and driven by a worm 49 (Figs. 2 and 5) secured upon a shaft 50 arranged approximately in parallelism with that at 45. The shaft 45 consists of two sections, having a universal joint connection for purposes not connected with the present invention. The two shafts 45 and 50 are geared together by gears indicated at 51, 52, respectively intermeshing with an intermediate idler gear 53 journaled on a stud shaft 54 in the wall of the bed, as shown in Fig. 5, so that the two shafts are rotated simultaneously, power being applied to the gear 51 on the shaft 45 from the variable speed gearing.

Figures 2, 3, 4:
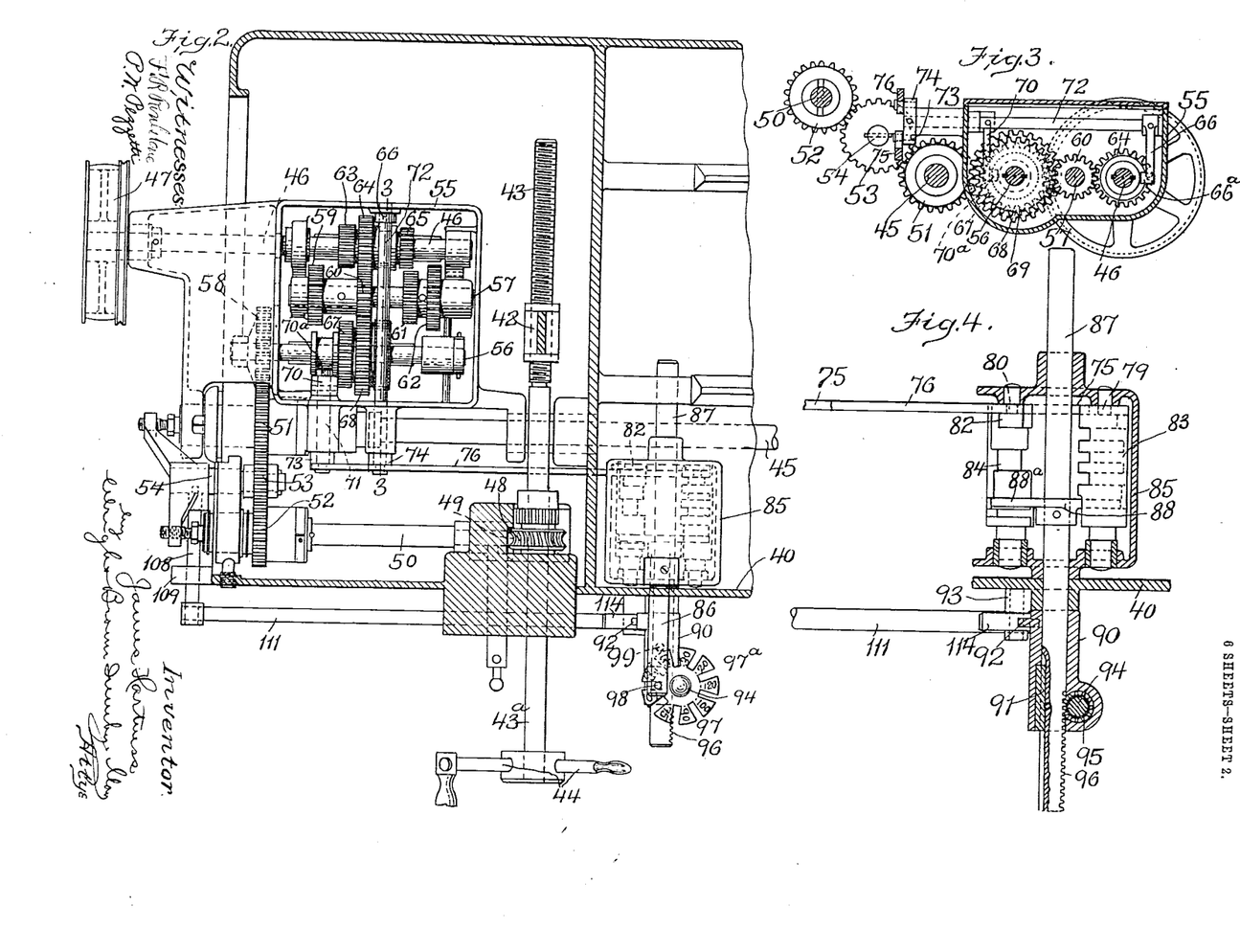
Fig. 2 represents a horizontal section through the same immediately below the work carriage.
Fig. 3 represents a section through the variable-speed gearing on the line 3—3 of Fig. 2.
Fig. 4 represents a horizontal section through the selector mechanism.
Figure 4A:
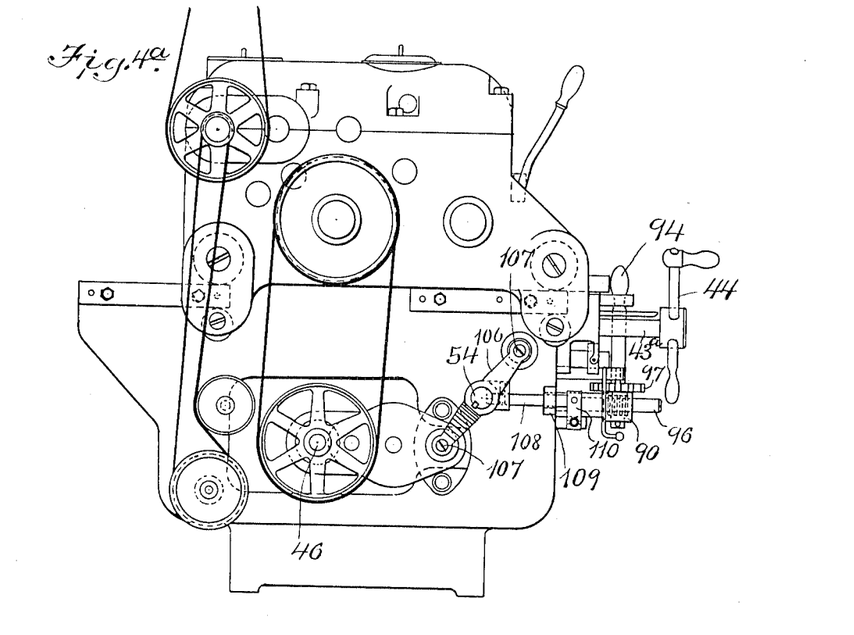
Figure 4B:
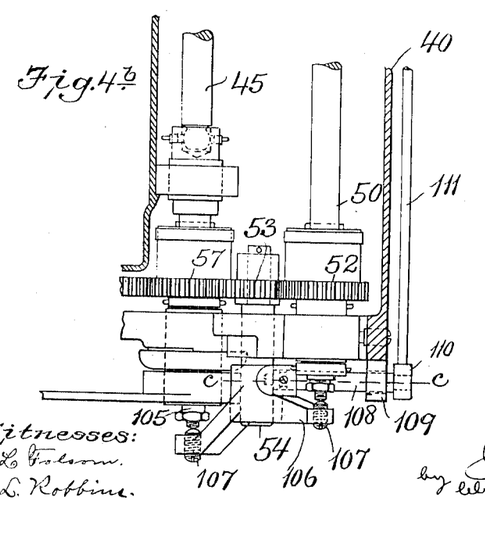
Figure 4C:
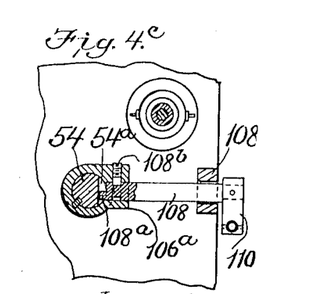
Figures 5, 6, 7:
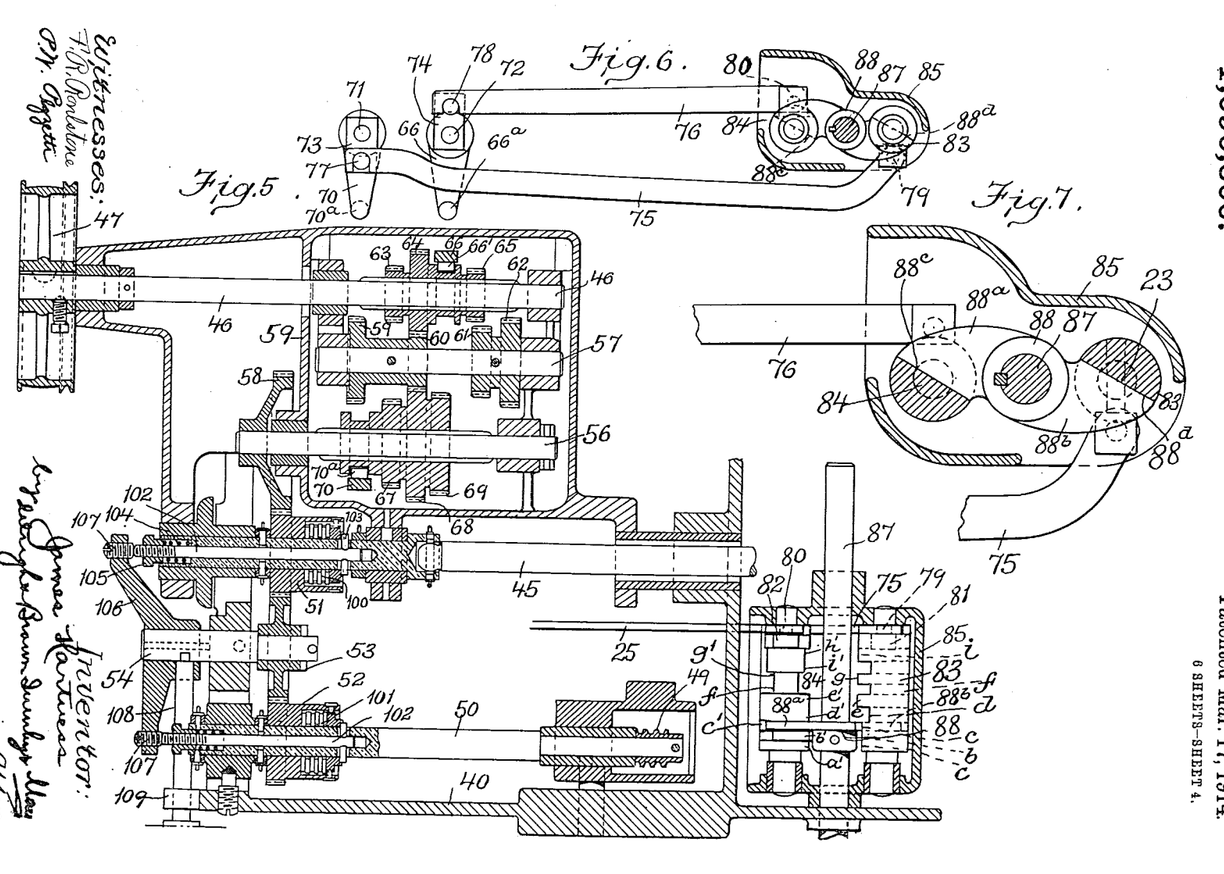
Fig. 5 represents a horizontal section through the speed-changing mechanism and the shafts which effect the movement of the work carriage and the tool carriage. This view is practically a development of the gearing on different planes.
Fig. 6 illustrates the connections between the clutches of the variable-speed gearing and the selector mechanism.
Fig. 7 is an enlarged sectional view of the selector mechanism illustrated in Fig. 6.

The variable-speed gearing, which may be controlled by clutches but which in the present embodiment of the invention includes change or slip gears, is located in a box 55 in the bed, and the shaft 46 extends into the said box, as illustrated in Figs. 2 and 5. The variable-speed mechanism includes a shaft 56 journaled in bearings in the box and projecting through the side wall of the box, and an intermediate shaft 57 likewise journaled in bearings in the box. The projecting end of the shaft 56 has secured thereon a gear 58 which intermeshes with and drives the gear 51 on the shaft 45. On the intermediate shaft 57 are rigidly secured a set of what may be termed the fixed gears 59, 60, 61 and 62, of different diameters, and splined on the shaft 46 is a set of change gears comprising the three driving gears 65, 63 and 64, all formed on the same hub and adapted to intermesh respectively with the gears 62, 59 and 60 according to the position to which the change-driving gears are moved to secure three variations in the speed of the shaft 57. They are moved longitudinally upon the shaft 46 by an arm 66 secured upon a cross rock-shaft 72 and having a finger 66ª projecting into a peripheral groove formed in the hub of the driving change gears (see Figs. 2 and 3). Splined on the shaft 56 is a set of change gears comprising the driven gears 67, 68 and 69, of different diameters, adapted to intermesh respectively with the gears 59, 60 and 61, according to the position occupied by the driven change gears. These last mentioned gears 67, 68 and 69, are all formed on the same hub, which is moved longitudinally of the shaft 56 by an arm 70 having a pin or projection 70ª entering a peripheral groove on said hub. The arm 70 is formed on or secured to a shaft 71 parallel with that at 72, said shafts 71 and 72 projecting through the front wall of the box, as shown in Fig. 2, and being provided respectively on their projecting ends with arms 73, 74. The arm 73 depends from the shaft 71, whereas the arm 74 projects upward therefrom as shown in Fig. 6.

By rocking the shafts 71 and 72 (which may be considered as gear controllers or members for putting the several trains in condition for operation) in one direction or the other, the driving and driven change gears may be adjusted to cause the shaft 56 to be driven at any one of nine speeds, as will be understood without detailed explanation, since the driving change gears may be adjusted to any one of three positions and the driven change gears may be likewise adjusted to any one of three different positions. As a result of this construction, power may be transmitted from the driving element 46 to the driven elements 45 and 43 to secure nine variations in the speed of rotation thereof. By varying the number of trains of gears forming the variable speed gearing I may secure a larger or smaller number of variations, but I find that for all practical purposes, particularly in connection with metal-turning machines, nine speeds are sufficient. Heretofore in change speed gearings it has been the custom to adjust each train or set of change gears by hand, independently of the other, and consequently to do this, it has heretofore been necessary to consult a speed table, with which the machine is supplied, to get the proper combinations of gears.

In accordance with the present invention I employ selector mechanism for actuating the gear controllers by which the change gears may be moved to any selected position to condition for operation any particular train and thereby to secure the desired speed of the driven element. This selector mechanism is connected with the rock-shafts 71 and 72, as will be now explained.

Figures 8, 9, 10, 11, 11A, 12, 13:
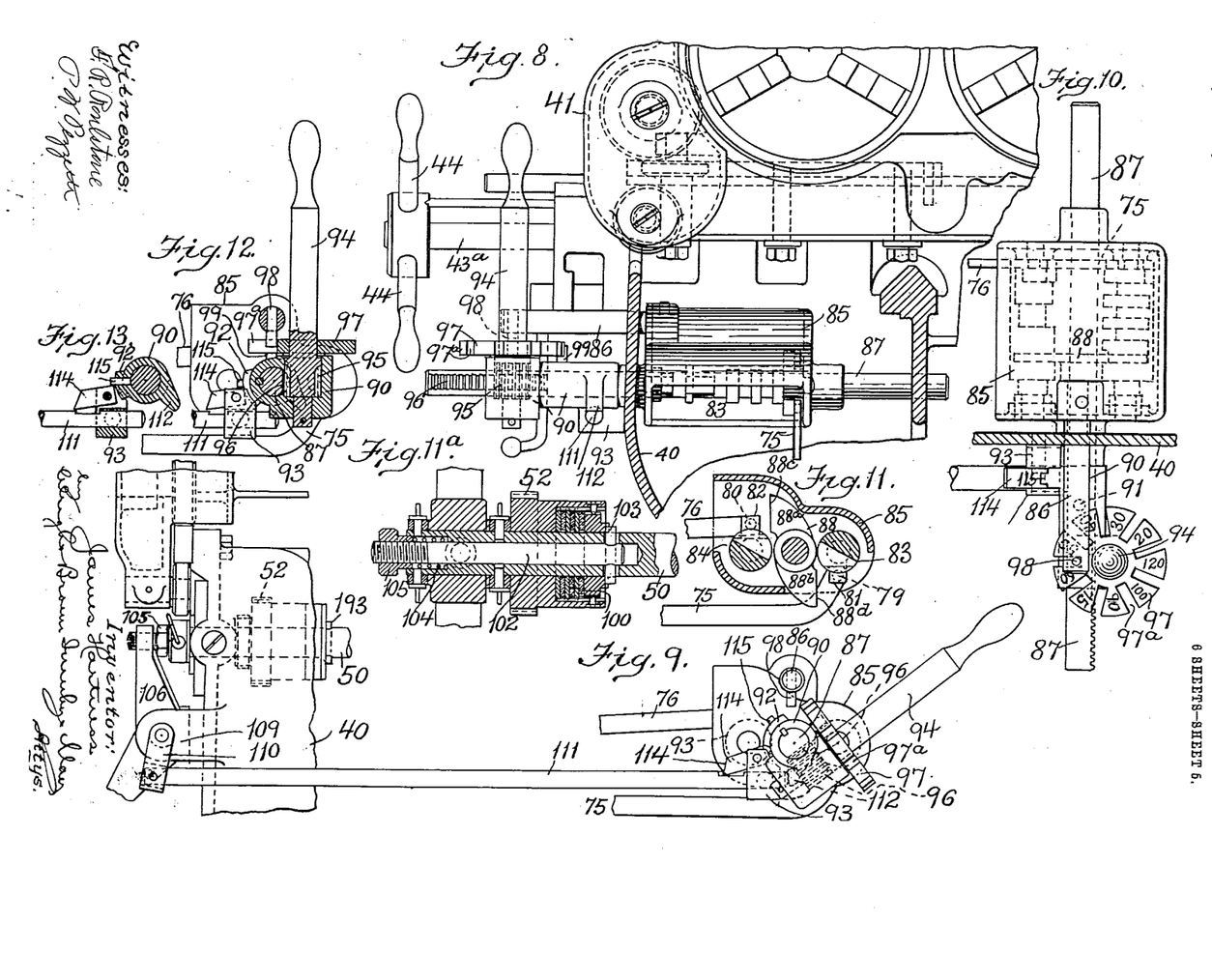
Figures 14, 16, 19, 20, 21, 22:
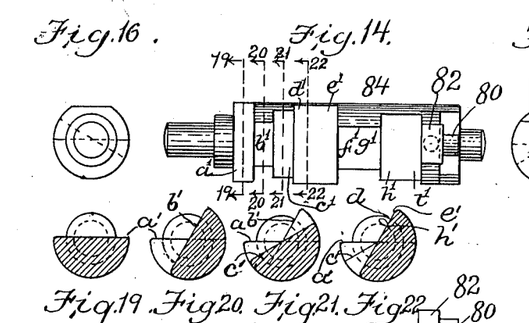
Figs. 14 to 22 illustrate one of the cam shafts or rockers forming a part of the selector mechanism, Figs. 19, 20, 21 and 22 illustrating respective sections on the lines 19—19, 20—20, 21—21 and 22—22 of Fig. 14.
Figure 15:
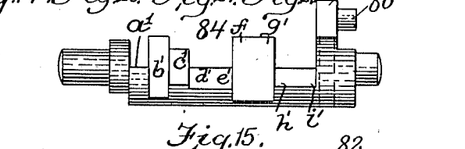
Figure 17:
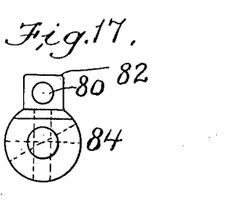
Figure 18:
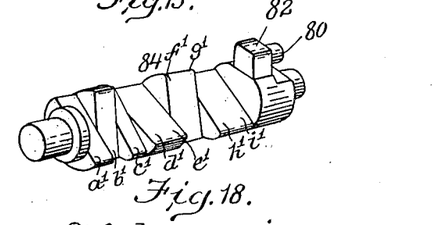
Figures 23, 26:
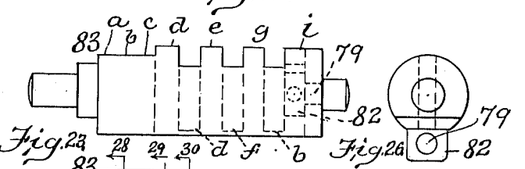
Figs. 23 to 30 inclusive illustrate the other cam shaft or rocker which forms a part of the selector mechanism, Figs. 28, 29 and 30 being sections on the lines 28—28, 29—29, and 30—30 of Fig. 24.
Figures 24, 27, 29:
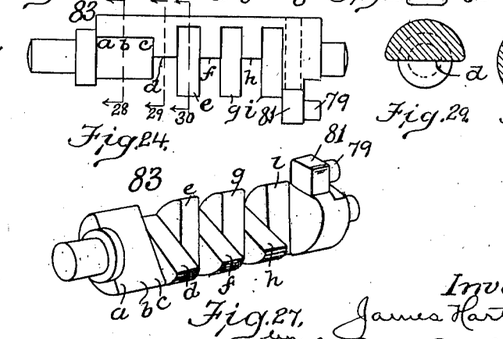
Figure 25:
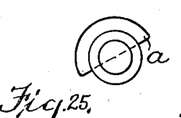
Figure 28:
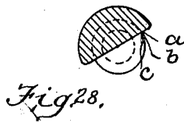
Figure 30:
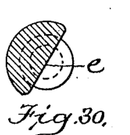

Pivotally connected with the two arms 73 and 74 are two connecting rods 75, 76, having notched ends adapted to engage pins 77, 78, projecting from the arms 73, 74, as shown in Fig. 6. For convenience these two rods are arranged one above the other and they are pivotally connected to studs 79 and 80 projecting laterally from arms 81, 82, formed on two cam shafts or cam rockers indicated as a whole at 83, 84, as shown in Figs. 4, 6, 7, 18 and 27. These cam shafts or cam rockers are arranged in parallelism and their ends are journaled in a casing 85 located behind the front wall of the bed. This casing is hung on a bar 86 which projects through the wall of the bed and is also supported by a bar 87 which projects through hubs formed on the ends of the casing. The said bar, as shown in Fig. 8, extends through the front and rear walls of the bed, and it serves another purpose, as will be presently explained. By rocking the cam shafts or rockers in one direction or the other the connecting rods 75, 76, may be moved lengthwise to rock the shafts 71, 72, to vary the positions of the change gears. Inasmuch as each set of change gears is movable into three different positions, the cam rockers must be not only rotatively adjusted or moved to occupy three different positions, but they must be also moved into nine different positions relatively to each other, and consequently to accomplish this each of the rockers is provided with nine corresponding faces, which for convenience I call "cam faces."

By Figs. 23 to 30 inclusive it will be seen that the cam rocker 83 is cut away to provide plane diametrical faces $a$, $b$, $c$, $d$, $e$, $f$, $g$, $h$, and $i$,—those at $a$, $b$, $c$ being in the same plane, those at $d$, $f$ and $h$ in another plane at an angle of 30 degrees to the faces $a$, $b$, and $c$, and those at $e$, $g$ and $i$ at an angle of 60 degrees to the faces $d$, $f$ and $h$ and at an angle of 30 degrees to faces $a$, $b$ and $c$. By referring to Figs. 14 to 22 inclusive, it will be noted that the rocker 84 has diametrical plane faces $a^1$, $b^1$, $c^1$, $d^1$, $e^1$, $f^1$, $g^1$, $h^1$, and $i^1$, equal in number to those on the rocker 83 and arranged in the order named. The faces $b^1$, $f^1$, and $g^1$, are all in the same plane; the faces $a^1$, $d^1$, and $e^1$, are in another plane at an angle of 30 degrees thereto; and the faces $c^1$, $h^1$, and $i^1$, are in a third plane at an angle of 60 degrees to those at $b^1$, $f^1$, and $g^1$, and at an angle of 30 degrees to those at $a^1$, $d^1$, and $e^1$. These two rockers are journaled in the casing with the faces, considered as a whole, of the rocker 84, on the top side of the rocker, and those on the rocker 83 are on the under side, and with the faces at $a$ to $i$, opposite those at $a^1$ to $i^1$, so that there are nine pairs of corresponding faces.

I have stated that passing through the casing 85 there is a bar 87. This bar is adapted to be moved lengthwise, and to it is rigidly keyed a two-armed lever 88, the arms of which are respectively indicated at 88ª and 88ᵇ. These arms are curved for convenience, and on the ends thereof are flat faces 88ᶜ, 88ᵈ which are parallel. These arms are relatively narrow so that the end of each will engage only one cam face on the adjacent rocker. The bar 87 is located between the rockers with its axis in the plane of the axes of the rockers, as shown in Fig. 7, and may be rotated to disengage the arms 88ª, 88ᵇ from the rockers, and then moved lengthwise to bring the arms into registration with any pair of confronting cam faces on the two rockers. When the two-armed lever is brought into registration with any two corresponding faces of the two rockers, the bar may be rotated to bring the ends of the arms into firm engagement with said faces, whereby the rockers will be rocked on their axes in one direction or the other to shift the connecting rods 75, 76, and thereby move the change gears (or clutches, if clutches be used in lieu of change gears). The cam faces, however, are so disposed that when the lever 88 registers with the faces $a$, $b$ or $c$ of the rocker 83, the said rocker will remain stationary, but the other rocker will be moved to three different positions by reason of the relative angularity of the three faces $a^1$, $b^1$ and $c^1$. Consequently the change gears 67, 68 and 69 will remain stationary, and the change gears 65, 63, and 64, will be caused to intermesh successively with the gears 62, 59 and 60 on the intermediate shaft 57 to cause successive increases in speed in the driven member, at this time the low gear 68 intermeshing with the gear 60. When the lever 88 successively registers with and engages the faces $d$, $d^1$, $e$, $e^1$, $f$, $f^1$, of the rockers, the change gears are successively adjusted in position to secure the three next gradations in speed; and when the lever 88 is moved to register successively with the faces $g$, $g^1$, $h$, $h^1$, and $i$, $i^1$, the change gears are again shifted to secure the next three gradations in speed. Thus the two-armed lever 88, with the bar or shaft 87, constitutes what I term a selector for selecting for actuation the change gears to secure the desired speed of the driven element. I would not consider it a departure from my invention if the cam faces were formed on the selector instead of on the rockers.

I will now explain the mechanism by which the selector is adjusted in position and rocked to move the rockers about their axes.

Referring to Figs. 1, 2, 4, 8, 9 and 12, it will be seen that on the forwardly projecting end of the shaft 87 there is a sleeve or hub 90 to which the bar 87 is splined, as indicated at 91 in Fig. 4, so that while the bar 87 may be moved endwise with reference to the sleeve it will be caused to oscillate therewith. By any convenient means the sleeve is held against axial movement, as for instance by a rib 92, engaged with a block 93 secured to the front side of the bed. The sleeve 90 at its outer end is laterally extended to form a bearing for an arm or controller 94 which is located therein, the projecting end of which is formed as a handle so that it may be manually rotated. This arm may be swung about one axis to move the sleeve about said axis, as shown in Figs. 9 and 12; but it is also provided with a pinion 95 engaged with rack teeth 96 on the bar shaft 87 so that by rotating the arm 94 on its longitudinal axis the bar 87 may be moved lengthwise of the rockers to set the selector in registration with any pair of cam faces. Secured upon the arm 94 is a dial or disk 97 which is affixed thereto so as to rotate therewith, and said dial has nine segments formed by nine equally spaced radial slots 97$^a$, any one of which slots may be brought into engagement and registration with a pin 98 depending from the bar 86 which projects forward from the bed and assists in supporting the casing for the selector mechanism. Between the slots the dial bears upon its face numerals indicating the speeds of travel of the carriage, expressed in terms of revolution of the work per inch of travel of the carriage, which speeds may be secured by the variable speed gearing. The rack teeth on the bar 87 and the pinion 95 are in such ratio so that nine-tenths of one complete rotation of the controller and disk will cause the selector to be advanced throughout its entire length of travel, and to register successively with all the cam faces on the rockers. On the sleeve 90 there is an index pin 99 close to the periphery of the disk, so that when the middle of any one of the segments of the disk bearing the numeral of the desired speed registers with the pin, the proper slot will be in alinement with the pin 98.

In practice, to set the selector, the arm 94 is swung about is transverse axis from the position shown in Fig. 12 to the position shown in Fig. 9; then the arm 94 is rotated about its longitudinal axis in one direction or the other until the numeral indicating the speed desired registers with the pin 99. The rocking of the sleeve moves the selector away from the cam faces on the rockers, and the rotation of the arm 94 moves the selector into registration with the pair of corresponding cam faces which will cause the change gears to be properly located to get the desired speed. Then the arm 94 is rocked back into the position shown by Fig. 12 to cause the disk to be engaged with the pin 98 in the proper slot. This locks the gear 95 against rotation. As the arm 95 is swung upward, the ends of the selector engage the cam faces with which it registers and rocks the cam rockers, whereby through the connections between said rockers and the change gears, said gears will be shifted to the corresponding positions to transmit the indicated speed to the driven element. Thus I provide a controller for adjusting the selector to the desired position, locking it in that position and actuating the selector to vary the position of the change gears and thereby secure a variation in the speed of the driven parts.

In order that the variable speed gearing may be relieved of its load by being disconnected from the driven parts or elements when the selector is being adjusted and actuated, I provide means by which this may be accomplished. Referring to Figs. 5 4$^a$ and 4$^b$ and 11$^a$, it will be seen that the two gears 51 and 52 on the shafts 45 and 50 are connected with the said shafts by friction disk clutches indicated as a whole at 100 and 101. As the construction of such clutches is well known, I will not describe them in detail. The clutches are normally active, being maintained in that condition by devices which are similar in the two shafts, so that I shall explain only one of them. This device consists of a rod 102 located in an aperture in the shaft and having a cross pin 103 to engage the movable element of the clutch and compress the disks into frictional engagement. The rod 102 is held in its active position by a spring 104 which encircles it and is located in the socket in the shaft, the spring bearing against a collar 105 screwed on the end of the rod 102. By moving these two rods 102 against the tension of their springs, the friction disk clutches will be opened so that the gears 51, 52, will run idly. To do this I provide a connection between the selector-actuating mechanism and a cross head 106 which has abutment screws 107 abutting against the ends of the rods 102. This cross head is mounted to slide upon the stud shaft 54 and is moved back and forth by a rock shaft 108 which is arranged horizontally and projects to the front of the bed as shown in Figs. 2, 4ª, 4ᵇ, 4ᶜ, 5 and 9. The outer end of the shaft is loosely journaled in an ear 109 on the end of the bed and its inner end is journaled in a boss 106ª on the hub of the cross head. On the inner extremity of the shaft 108 there is a crank pin or eccentric 108ª which takes into a groove 54ª in the stud shaft 54, so that, when the rock shaft 108 is rocked, the cross head will be moved longitudinally upon the stud shaft 54. The rock shaft is held in place by a screw pin 108ᵇ taking into a peripheral groove in said shaft as clearly shown in Fig. 4ᶜ. On its front end said rock shaft 108 has a downwardly projecting arm 110 to which is pivoted a connecting rod 111 extending along the front side of the bed, as shown in Fig. 1, and at its righthand end passing through an aperture in the block 93 to which I have previously referred as being attached to the front side of the bed adjacent the selector-actuating mechanism. The sleeve 90 is formed with a cam projection 112 (see Fig. 13) extending downwardly in proximity to the end of the connecting rod 111 so that when the arm 94 is rocked downwardly to the position shown in Fig. 9 the cam 112 will engage the rod 111 and move it to the left to rock the shaft 108 and move the cross head to the right, thereby releasing the disk clutches and permitting the gears 51 and 52 to run idly on their respective shafts 45 and 50 whereby the driven shafts will no longer receive power from the variable speed gearing. To hold the cross head in this position until the selector has been adjusted, the block 93 is provided with a pawl 114 which rests upon the top of the connecting rod 111 and is adapted to drop into a notch formed therein, as shown in Fig. 9. This holds the cross head in the position into which is was moved by engagement of the cam 112 with the connecting rod 111. The pawl is disengaged from the connecting rod when the arm 94 is returned to upright position, by a pin 115 on the rib 92 of the sleeve 90, as shown in Fig. 13. As soon as the pawl is disengaged from the connecting rod, the springs 104 in the shafts 45 and 50 restore the friction-disk clutches to active condition to effect the transmission of power from the variable speed gearing to the shafts 45 and 43.

Those persons who are skilled in the art to which this invention relates will perceive the advantages flowing from the construction which I have described. As previously indicated, it enables an operator with the greatest rapidity to change the speed of the driven part of the machine to any other desired speed, the single controller 45 serving not only to adjust the selector to the desired position but also serving through the medium of the sleeve and the shaft 87 to rock the selector into positive engagement with the cam faces on the rockers and oscillate the rockers to shift the change gearing. Incidental to the particular mechanism which I have described, the speed of both the tool carriage and the work carriage is varied by the same operation of the selecting and gearshifting mechanism.

In employing the term "members or devices for putting the trains of gears in condition for operation", I refer, in the specific embodiment of the invention, to the levers which slide the change gears to place any particular train of gears in position or relation to transmit power from the driving element to the driven element, but I mean thereby to include any mechanism such as clutch controllers which perform an equivalent function in operating clutches to clutch into power transmitting and receiving relation any particular train of gears in a variable speed power transmitting mechanism. In the particular embodiment of the invention illustrated and described herein, each of the said devices or members controls at least two (three in the present case) trains of gears to place one or the other in condition for operation, according to the position to which it is moved, and the rockers or actuators are so connected to said members, that when the rockers or actuators are actuated by the selector each assumes one of several predetermined positions to position its connected or corresponding member or device.

In providing the rockers or actuators with the flat faces upon their peripheries, the engaging ends of the selector (when the latter is actuated by the controller) positively moves said rockers in one direction or the other, thus doing away with the necessity of employing springs. The controller positions the selector between any pair of corresponding cam faces on the rockers, to select for operation the particular train of gears to transmit the desired speed, and then actuates the selector to condition said train for operation. The movement of the selector to any predetermined position with reference to the rockers or actuators is attained by moving the controller about one axis, and the actuation of said selector is secured by moving said controller about another axis.

Having thus explained the nature of my said invention and described a way of constructing and using the same, although without attempting to set forth all the forms in which it may be made or all the modes of its use, what I claim is:

1. The combination with a driving element, a driven element, and variable speed power transmitting mechanism between said elements, comprising a plurality of trains of gears and devices for putting said trains in condition for operation, of a selector for positively actuating said devices in opposite directions and movable into several different positions to select for operation any certain train of gears.

2. The combination with a driving element, a driven element, and variable speed power transmitting mechanism between said elements, comprising a plurality of trains of gears and gear-controlling members for putting said trains in condition for operation, of independent actuators connected to said members and adapted to be operated simultaneously, and a selector movable with respect to said actuators for simultaneously positioning said actuators.

3. The combination with a driving element, a driven element, and variable speed power transmitting mechanism between said elements comprising a plurality of trains of gears and members for putting said trains in condition for operation, of actuators connected to said members, and a selector for engaging and operating said actuators, said actuators and selector having coacting cam faces.

4. The combination with a driving element, a driven element, and variable speed power transmitting mechanism between said elements comprising a plurality of trains of gears and members for putting said trains in condition for operation, of actuators connected to said members and each having faces of varying angularity, and a selector movable into successive registration with the corresponding faces of said actuators to operate said actuators.

5. The combination with a driving element, a driven element, and variable speed power transmitting mechanism between said elements comprising a plurality of trains of gears and members for putting said trains in condition for operation, of actuators connected to said members and arranged in parallelism, said actuators having corresponding faces, the faces on each actuator varying in angularity, a selector movable along said actuators into successive registration with the pairs of corresponding faces on said actuators, and means for actuating said selector in consequence of which its engagement with said faces moves said actuators and thereby said members.

6. The combination with a variable speed power transmitting mechanism comprising a plurality of trains of gears including two sets of change gears, and members one for each set of change gears for putting said trains in condition for operation, of a selector mechanism for selecting any desired train and positively actuating said members to put said train in condition for or out of condition for operation.

7. The combination with a variable speed power transmitting mechanism comprising a plurality of trains of gears, and members for putting said trains in condition for operation, of a selector mechanism for selecting any desired train and actuating said members to put said train in operation, said selector mechanism comprising a selector, and a rotatable controller for positioning said selector, and then actuating it to operate said members.

8. The combination with a variable speed power transmitting mechanism comprising a plurality of trains of gears, and members for putting said trains in condition for operation, of a selector mechanism for selecting any desired train and actuating said members to put said train in operation, said selector mechanism comprising a selector, a controller rotatable on axes at angles to each other connected thereto, means by which the rotation of the controller on one axis positions said selector, and means by which the rotation of said controller on its other axis actuates said selector.

9. The combination with a variable speed power-transmitting mechanism, comprising a plurality of trains of gears, and members for putting said trains in condition for operation, of a selector mechanism connected to said members for selecting any desired train and actuating said members to put said train in operation, said selecting mechanism comprising rockers connected to said members and rotatable to assume several angularly varying positions, a selector adapted to be positioned to move said rockers into different positions, and means for actuating said selector to move said rockers.

10. The combination with a variable speed power-transmitting mechanism, comprising a plurality of trains of gears, and members for putting said trains in condition for operation, of a selector mechanism connected to said members for selecting any desired train and actuating said members to put said train in operation, said selecting mechanism comprising movable elements connected to said members respectively, a selector movable laterally with respect to said elements, said elements and selector having cam faces which may be selected for registration by moving said selector, and means for actuating said selector.

11. The combination with a variable speed power-transmitting mechanism, comprising a plurality of trains of gears, and members for putting said trains in condition for operation, of a selector mechanism connected to said members for selecting any desired train and actuating said members to put said train in operation, said selecting mechanism comprising movable elements connected to said members respectively, a rocking selector, said members and selector having cam faces which may be selected for registration by moving said selector lengthwise of its axis, and means for rocking said selector to actuate said members by the registering cam faces.

12. In mechanism such as described, the combination with a variable speed power-transmitting mechanism comprising a plurality of trains of gears, of the gear-controlling members, rockers connected to said members and having oppositely disposed cam faces, some of the cam faces on each rocker being angular with respect to others thereon, a selector having arms to engage a pair of opposing cam faces on said rockers, and movable to register with said faces successively, and means for moving said selector, and rocking it to cause its arms to engage said cam faces and rock said rockers.

13. In mechanism such as described, the combination with a variable speed power-transmitting mechanism comprising a plurality of trains of gears, of the gear-controlling mechanism, including a gear-train selecting mechanism comprising a selector and a controller for positioning and then actuating said selector.

14. In mechanism such as described, the combination with a variable speed power-transmitting mechanism comprising a plurality of trains of gears, of the gear-controlling mechanism, including a gear-train selecting mechanism comprising a rocking selector, a shaft therefor, and a controller operatively connected to said shaft to move it lengthwise and to rock it.

15. The combination with a driving element, a driven element and variable speed power-transmitting mechanism comprising a plurality of trains of gears, and arranged to rotate said driven element at any one of a number of rates of speed, of mechanism including a rotatable controller, and means by which movement of said controller selects and puts in condition for operation said trains of gears respectively successively to increase or decrease gradually the speed of the driven member.

16. The combination with a driving element, a driven element and variable speed power-transmitting mechanism comprising a plurality of trains of gears, and arranged to rotate said driven element at any one of a number of rates of speed, of mechanism including a selector, gear-controlling members positively actuated by said selector, a controller for both positioning said selector and actuating said selector to put any given train in condition for operation, and means for locking said controller.

17. The combination with a variable speed power-transmitting mechanism comprising a plurality of trains of gears, of gear-controlling members, elements connected with said members and adapted to be selectively actuated, a selector, and a controller rotatable on one axis to position said selector relatively to said members and rotatable on another axis to actuate said selector and operate said members.

18. The combination with a variable speed power-transmitting mechanism comprising a plurality of trains of gears, of controlling members for said gears, cam-faced actuators connected to said members, a selector movable into registration with the corresponding cam faces of said actuators, a longitudinally movable shaft on which said selector is secured, said shaft having a rack, and a controller having a pinion meshing with said rack to move said shaft longitudinally and thereby position said selector.

19. The combination with a variable speed power-transmitting mechanism comprising a plurality of trains of gears, of controlling members for said gears, cam-faced actuators connected to said members, a selector movable into registration with the corresponding cam faces of said actuators, a longitudinally movable shaft on which said selector is secured, said shaft having a rack, a controller having a pinion meshing with said rack to move said shaft longitudinally, and thereby position said selector, and means by which said controller and shaft are rotatable about a common axis to actuate said selector and thereby said actuators.

20. The combination with a variable speed power-transmitting mechanism comprising two independent sets of change gears and an intermediate set of fixed gears, of a selector movable into different positions, and means for shifting said sets of change gears controlled and actuated by said selector.

21. The combination of a variable speed power-transmitting mechanism comprising two independent sets of movable change gears, and an intermediate set of fixed gears, gear-shifting devices, adapted to locate said sets of movable gears in different relations to vary the transmitted speed, and a selector having means for controlling and actuating said gear-shifting devices simultaneously if desired.

22. The combination with a driving element, a driven element, and a variable speed power-transmitting mechanism comprising a plurality of trains of gears including two sets of change gears and an intermediate set of fixed gears, and members, each controlling one of said sets of change gears and movable to a plurality of predetermined positions to put in condition for operation a plurality of said trains of gears, of a selector mechanism for positioning said members, comprising a selector movable successively into as many positions as there are trains of gears, and means controlled thereby for positioning said members to cause all of said trains to be conditioned for operation successively, whereby the speed of the driven element will be gradually increased or diminished without varying the speed of the driving element.

23. The combination with a driving element, a driven element, and a variable speed power-transmitting mechanism comprising a plurality of trains of gears, and members, each movable to a plurality of predetermined positions to put in condition for operation a plurality of said trains of gears, of a selector mechanism for positioning said members, comprising a selector movable successively into as many positions as there are trains of gears, actuators connected respectively to said members, said actuators each having a plurality of faces equal in number to said gear trains, and a controller for positioning said selector adjacent any corresponding pair of said faces and for actuating said selector to engage said faces and thereby actuate said actuators to condition the corresponding train of gears for operation.

24. The combination with a driving element, a driven element, and a variable speed power-transmitting mechanism comprising a plurality of trains of gears, a member movable to a plurality of predetermined positions to put in condition for operation said trains of gears successively, and a selector mechanism comprising an actuator connected to said member and having relatively angular flat faces, a selector movable into operative relation to said faces successively, and having a complemental flat face to coact therewith, and means for actuating said selector after it has been positioned.

25. The combination with a driving element, a driven element, variable speed power-transmitting mechanism between said elements comprising a plurality of trains of gears, and selecting mechanism for putting said trains of gears in condition for operation successively comprising a controller and one or more gear-controlling members positioned thereby, of mechanism under the control of said controller for disconnecting said power-transmitting mechanism from said driven element.

26. The combination with a driving element, a driven element, variable speed power-transmitting mechanism between said elements comprising a plurality of trains of gears, and selecting mechanism for putting said trains of gears in condition for operation successively comprising a controller and one or more gear-controlling members positioned thereby, of mechanism under the control of said controller for disconnecting said power-transmitting mechanism from said driven element, and comprising a clutch and clutch-releasing mechanism actuated by said controller.

In testimony whereof I have affixed my signature, in presence of two witnesses.

JAMES HARTNESS.

Witnesses:
G. W. CLACE,
J. W. WALKER.